Figure 1:
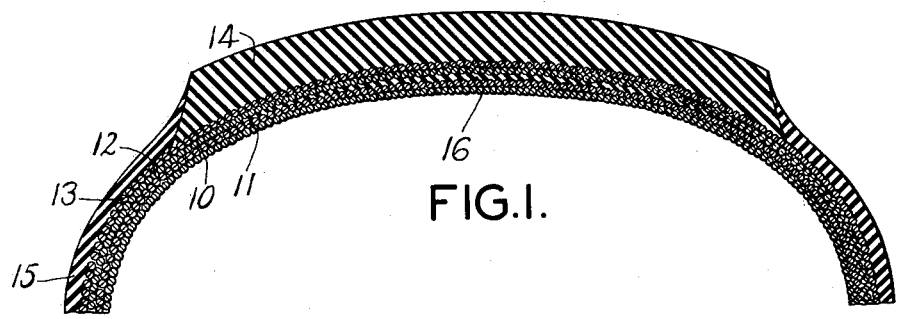

United States Patent Office 3,067,795
Patented Dec. 11, 1962

3,067,795
TIRE CASINGS
Louis Pierre François André Neuville and Louis Henri Noël Saint-Frison, Clermont-Ferrand, France, assignors to "Michelin & Cie," Clermont-Ferrand, France
Filed Mar. 17, 1959, Ser. No. 799,974
Claims priority, application France Mar. 19, 1958
3 Claims. (Cl. 152—354)

This invention relates to improvements in pneumatic tires and it relates particularly to improvements in the structure of the carcasses of such pneumatic tires.

The carcass of a conventional pneumatic tire is formed of a plurality of superimposed plies of woven fabric or cords, such as, textile cords, wires or cables, which lie parallel to each other in any one ply. The plies are disposed on a bias so that the warps of the fabric or the cords of one ply or one group of plies extend in a direction different from that of the warps or filaments of an adjacent ply or group of plies. The assembly of carcass plies is embedded in rubber.

At the crown or the tread zone of the tire, outside the carcass, a tread is applied which may be reinforced by means of a group of textile fabric breaker strips. The tread zone, even when reinforced with conventional fabric breaker strips, is susceptible to deformation by the side thrust which is exerted against the portion of the tread in contact with the ground when the vehicle on which the tire is mounted negotiates a curve. Also, the tread does not resist deformation by the internal transverse forces which are set up when the tire follows a straight course, resulting in an irregular deformation and slippage of the portion of the tread in contact with the road thereby causing unnecessarily rapid wear of the tire.

The present invention is concerned with an improvement in pneumatic tires having crossed carcass plies which reduces the deformation of the tire under stress and thereby overcomes the above-mentioned disadvantages of prior tires.

In accordance with the invention, a layer of an elastomeric material, such as rubber, synthetic rubber, resilient plastic or the like, having a modulus of elasticity greater than that of the rubber of the carcass and the tread is interposed between at least one pair of adjacent carcass plies, the layer extending laterally over a width not substantially greater than that of the tread.

The modulus of elasticity of the interposed material should not be less than 350 g./mm.$^2$ at 100% elongation. An elastomer having a modulus between about 1200 g./mm.$^2$ and about 2500 g./mm.$^2$ or even higher is suitable for the purposes of this invention, provided that the elastomer is not brittle and is sufficiently flexible to allow it to flex circumferentially when the tire is operated under load. The elastomeric material can be a natural rubber or a synthetic rubber, such, as for example "Butyl" rubber (a rubbery copolymer of isobutylene and a diolefin) "neoprene" (a chloroprene polymer) butadiene-styrene copolymers and the like or mixtures of the same.

By positioning one or more layers of relatively stretch-resistant (high modulus) elastomer between the carcass plies, they are restrained against relative shifting in the area of the tread zone so that it is reinforced and is rendered much more resistant to the lateral stresses causing deformation of the ground contacting portion of the tread.

For a better understanding of the present invention, reference may be had to the accompanying drawings in which FIGURES 1 to 4 are cross-sectional views of portions of tire casings embodying the present invention.

In all of the tires disclosed in the drawings, the carcass contains four superimposed crossed or bias-laid fabric or cord plies but it should be understood that the invention is not limited to the use of four plies. Fewer than four or more than four may be used under appropriate conditions. The carcass of the tire disclosed in FIGURE 1, contains four fabric plies, 10, 11, 12 and 13, the casing being completed by the tread 14 and the side walls 15. In this tire, a stress resistant layer 16 of elastomeric material having a static modulus of elasticity of at least 350 gr./mm.$^2$ is interposed between the plies 11 and 12 of the carcass.

Modulus of elasticity of rubber and other elastomers is expressed by the equation, $$K = P/S$$

wherein K is the modulus, S is the cross-section of the test piece and P is the force necessary to double the length of the test piece (100% elongation). With materials of very high modulus, it is not practical to elongate or stretch the test piece 100%. Such materials are elongated only 25% or some other convenient amount, and the modulus is then calculated from the results obtained to determine the force required to stretch the test piece 100%. In the metric system, and as used herein, modulus of elasticity is expressed in grams per mm.$^2$.

In the U.S. system, modulus of elasticity is expressed in pounds per square inch at 100% elongation. 350 grams per mm.$^2$ corresponds to approximately 510 pounds per square inch in the U.S. system.

Modulus of elasticity can also be expressed in dynes per cm.$^2$ at 100% elongation. A value of 350 grams per mm.$^2$ corresponds to about 34,300,000 dynes per cm.$^2$. Inasmuch as values expressed in dynes per cm.$^2$ are very high numerically and are not very convenient for indicating modulus of elasticity, they seldom are used except for expressing theoretical modulus of elasticity.

A suitable composition for use in the layer 16 is a follows:

| | Parts |
|---|---|
| Rubber | 100 |
| Carbon black | 60 |
| Heat hardening resin | 15–20 |
| ZnO | 10 |
| Anti-oxidant | 2 |
| Fatty acid | 3 |
| Santocure | 3 |
| DPG (diphenyl guanidine) | 1 |
| Sulfur | 4 |

A suitable heat hardening resin is a phenolic resin.
Santocure is N-cyclohexyl-2-benzothiazyl-sulfonamide, an accelerator manufactured by Monsanto Chemical Co.
A suitable fatty acid is stearic acid.
A suitable antioxidant for the rubber composition is sold by Naugatuck Chemical Co., a corporation of Connecticut, under the trade-mark "Flexamine."

The exemplary rubber composition, when vulcanized, has a modulus of elasticity of approximately 2,500 to 3,000 grams per mm.$^2$ (measured at 25% elongation and calculated to 100% elongation).

The layer 16 extends circumferentially completely around the tire but does not extend laterally substantially beyond the edges of the tread 14. The layer 16 must be thin so that it can flex readily and not break or crack in service. Layer 16 can vary in thickness between about 0.2 mm. and 2.0 mm. depending upon the size of the tire, i.e., for smaller tires, a layer approaching the minimum thickness will be used whereas in the larger tires such as truck tires, a thicker layer 16 may be provided.

The layer 16 of the high modulus elastomer between the plies 11 and 12 provides a greater stiffening of the tread of the tire than is possible with a very much thicker layer of the elastomer interposed between the carcass and the tread. In fact, if the layer 16 were disposed between the carcass and the tread it would have to be so thick that it would tend to crack or fracture when the tire is in use in order to have an effect comparable to that of the thin layer 16 in preventing deformation of the tread under laterally directed stresses.

Figure 2:
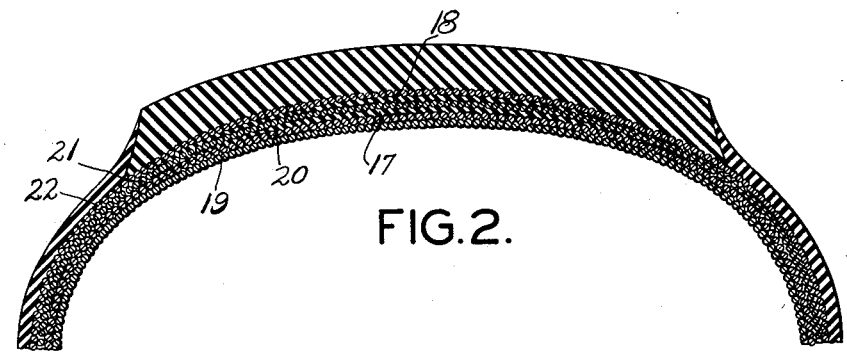

It will be understood that the location of the layer of high modulus elastomer and the number of such layers thereof can be varied so long as at least one of the layers is interposed between a pair of carcass plies. Thus, as shown in FIGURE 2, two layers 17 and 18 of a high modulus elastomer (350 g./mm.$^2$ at 100% elongation or higher) are interposed between the plies 19 and 20 and 20 and 21.

Figure 3:
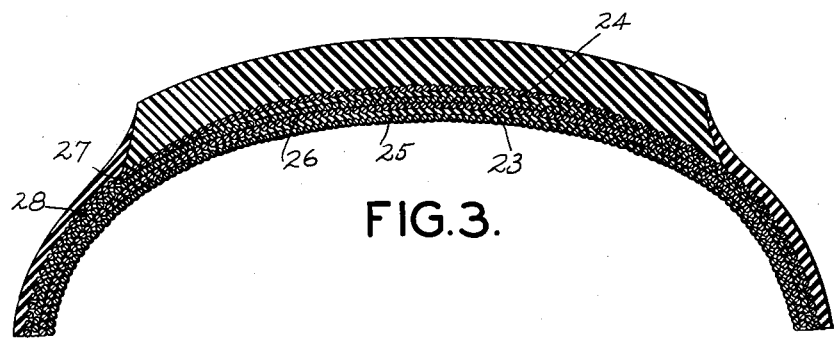

In the tire shown in FIGURE 3, two layers 23 and 24 of the high modulus elastomer are interposed between carcass plies 25 and 26 and 27 and 28 respectively.

Figure 4:
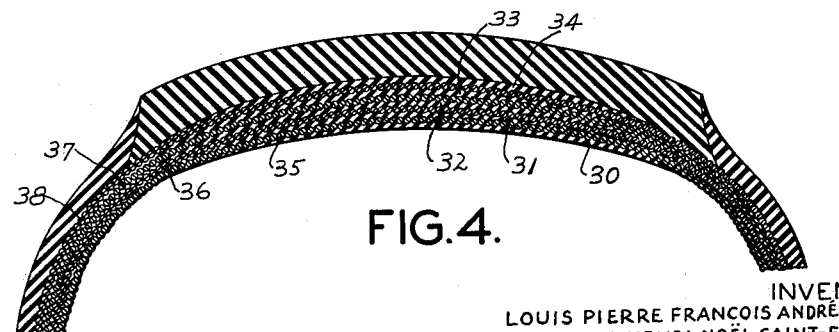

In the tire shown in FIGURE 4, five layers 30, 31, 32, 33 and 34 of high modulus elastomer (350 g./mm.$^2$ or higher at 100% elongation) are arranged alternately with the plies 35, 36, 37 and 38 in the tire carcass. It will be understood that the combined thicknesses of the reinforcing plies in each instance should not be great enough to render the tire rigid or brittle and that when increased numbers of high modulus layers are provided, these layers will be thinner so that their collective thicknesses are insufficient to render the tire brittle and subject to cracking or fracturing.

Inasmuch as the casing is susceptible to considerable modification as indicated above, the forms of the invention described above should be regarded as illustrative and not as limiting the scope of the following claims.

We claim:
1. A pneumatic tire having a tread and sidewalls and a carcass united with and reinforcing said tread and sidewalls, said carcass comprising a plurality of superimposed plies extending behind said tread and said sidewalls, each ply comprising a plurality of parallel cords, the cords of each ply extending at an angle to and crossing the cords of at least one other ply and at least one layer of an elastomer having a modulus of elasticity of at least 350 grams per square millimeter at 100% elongation interposed between an adjacent pair of said plies in the portion of the carcass located behind said tread, said layer of elastomer extending circumferentially of said carcass and transversely thereof over a width not substantially exceeding the width of said tread.

2. The pneumatic tire set forth in claim 1 in which said layer of elastomer has a thickness between about 0.2 mm. and 2.0 mm.

3. The pneumatic tire set forth in claim 1 comprising a plurality of layers of said elastomer, each layer being interposed between different pairs of said carcass plies.

References Cited in the file of this patent
UNITED STATES PATENTS

| | | |
|---|---|---|
| 1,117,530 | Strong | Nov. 17, 1914 |
| 2,006,315 | Hopkinson | June 25, 1935 |
| 2,452,998 | Cuthbertson | Nov. 2, 1948 |
| 2,811,998 | Bourdon | Nov. 5, 1957 |
| 2,979,100 | Woodall | Apr. 11, 1961 |